US009562444B2

(12) United States Patent
Nagai et al.

(10) Patent No.: US 9,562,444 B2
(45) Date of Patent: Feb. 7, 2017

(54) ENGINE WASTE-HEAT UTILIZATION DEVICE

(75) Inventors: Hiroyuki Nagai, Machida (JP); Shinichiro Mizoguchi, Atsugi (JP); Takayuki Ishikawa, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 83 days.

(21) Appl. No.: 14/237,977

(22) PCT Filed: Aug. 6, 2012

(86) PCT No.: PCT/JP2012/069972
§ 371 (c)(1),
(2), (4) Date: Feb. 10, 2014

(87) PCT Pub. No.: WO2013/046929
PCT Pub. Date: Apr. 4, 2013

(65) Prior Publication Data
US 2014/0165562 A1  Jun. 19, 2014

(30) Foreign Application Priority Data
Sep. 30, 2011  (JP) ................. 2011-216786

(51) Int. Cl.
F01K 23/10 (2006.01)
F01N 5/02 (2006.01)
F01P 7/16 (2006.01)
F02G 5/04 (2006.01)
F01K 23/06 (2006.01)
F01K 23/14 (2006.01)

(52) U.S. Cl.
CPC .......... F01K 23/101 (2013.01); F01K 23/065 (2013.01); F01K 23/10 (2013.01); F01K 23/14 (2013.01);
(Continued)

(58) Field of Classification Search
CPC ........ F01K 23/06; F01K 23/065; F01K 23/14; F01K 23/08; F01K 23/10; F01K 23/101
(Continued)

(56) References Cited

U.S. PATENT DOCUMENTS 4,545,335 A * 10/1985 Hayashi ................ F01P 3/2285
123/41.27
5,833,446 A * 11/1998 Smith ................... F01K 21/005
418/201.1
(Continued)

FOREIGN PATENT DOCUMENTS

EP  2 133 544 A1  12/2009
JP  2009-264353 A  11/2009
(Continued)

Primary Examiner — Thomas Denion
Assistant Examiner — Mickey France
(74) Attorney, Agent, or Firm — Drinker Biddle & Reath LLP

(57) ABSTRACT

An engine-waste-heat utilization device includes a Rankine cycle which includes a heat exchanger through which cooling water coming out from an engine flows to recover waste-heat of the engine to refrigerant, an expander which generates power using the refrigerant coming out from the heat exchanger, a condenser which condenses the refrigerant coming out from the expander and a refrigerant pump which supplies the refrigerant coming out from the condenser to the heat exchanger, and a cooling water passage in which the cooling water having a higher temperature flows when the Rankine cycle is operated than when the Rankine cycle is not operated.

7 Claims, 15 Drawing Sheets

(52) U.S. Cl.
CPC ............... *F01N 5/02* (2013.01); *F01P 7/165* (2013.01); *F02G 5/04* (2013.01); *F01P 2060/16* (2013.01); *F01P 2060/18* (2013.01); *Y02T 10/166* (2013.01)

(58) Field of Classification Search
USPC ......... 60/614, 615, 616, 618, 620, 624, 320, 60/321
See application file for complete search history.

(56) References Cited

U.S. PATENT DOCUMENTS

| | | | |
|---|---|---|---|
| 2002/0007636 A1* | 1/2002 | Hay | F01K 23/065 60/618 |
| 2002/0053325 A1* | 5/2002 | Fishman | F01P 7/167 123/41.1 |
| 2006/0225421 A1 | 10/2006 | Yamanaka et al. | |
| 2007/0175212 A1* | 8/2007 | Uno | F01C 13/04 60/519 |
| 2009/0241543 A1* | 10/2009 | Ernst | F01K 9/04 60/645 |
| 2011/0067390 A1* | 3/2011 | Cook | B61C 17/02 60/320 |
| 2011/0088397 A1 | 4/2011 | Mori et al. | |
| 2011/0220729 A1* | 9/2011 | Bucknell | F01N 5/02 237/12.3 R |

FOREIGN PATENT DOCUMENTS

| | | |
|---|---|---|
| JP | 2009-274513 A | 11/2009 |
| JP | 2011-214480 A | 10/2011 |

* cited by examiner

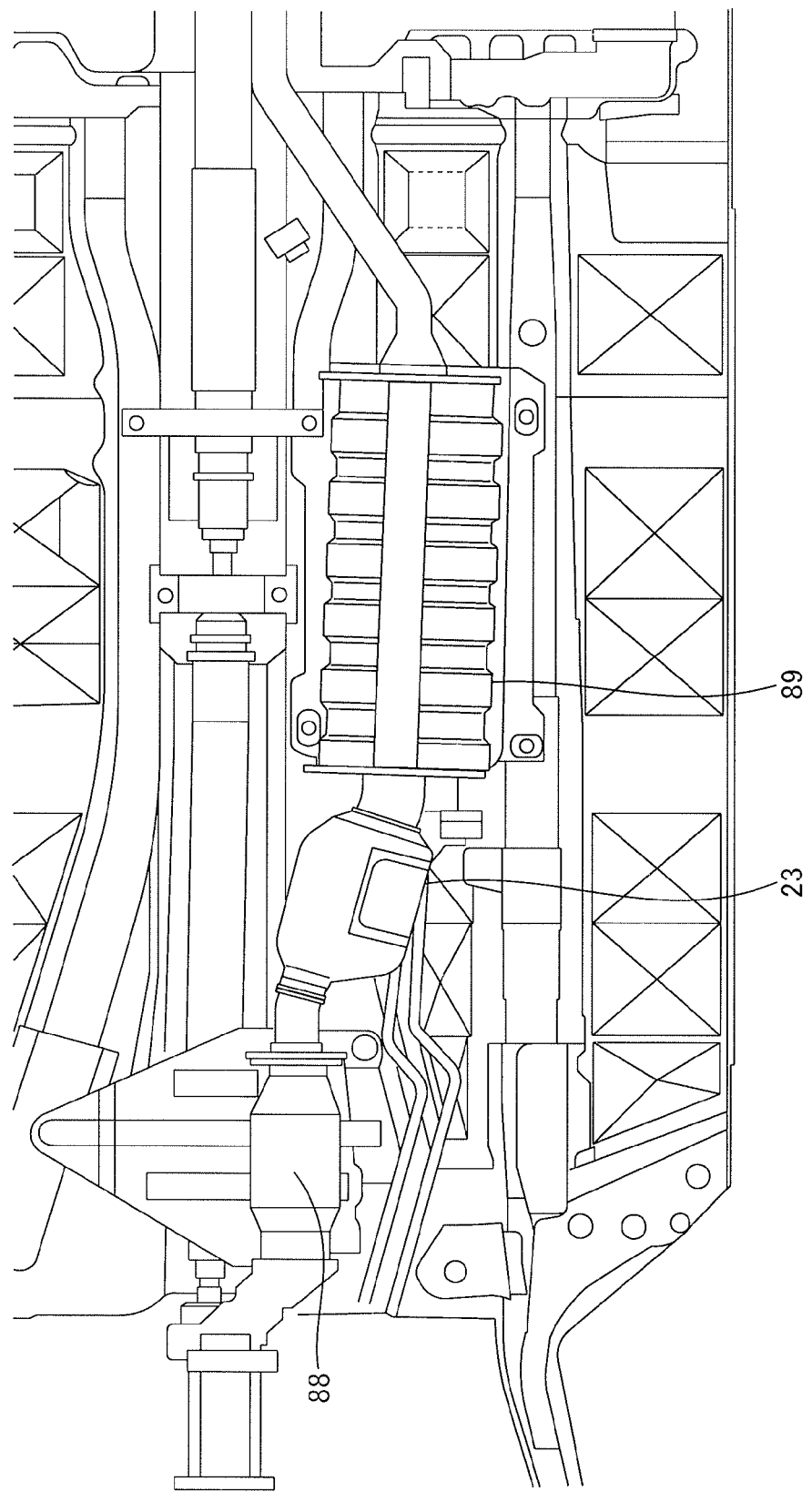

ENGINE WASTE-HEAT UTILIZATION DEVICE

TECHNICAL FIELD

This invention relates to an engine-waste-heat utilization device including a Rankine cycle.

BACKGROUND ART

A Rankine cycle of JP2009-264353A issued in 2009 by the Japan Patent Office recovers waste-heat of an engine in which a mechanical thermostat valve is provided in a junction part between a cooling water passage passing through a radiator and a bypass passage bypassing the radiator.

SUMMARY OF INVENTION

However, how to set a cooling water temperature depending on whether the Rankine cycle is operated or not operated is not disclosed in JP2009-264353A at all.

The present invention was developed, focusing on such a conventional problem. An object of the present invention is to provide an engine-waste-heat utilization device capable of improving heat recovery efficiency of an expander when a Rankine cycle is operated.

An engine-waste-heat utilization device according to one aspect of the present invention includes a Rankine cycle which includes a heat exchanger through which cooling water coming out from an engine flows to recover waste-heat of the engine to refrigerant, an expander which generates power using the refrigerant coming out from the heat exchanger, a condenser which condenses the refrigerant coming out from the expander and a refrigerant pump which supplies the refrigerant coming out from the condenser to the heat exchanger, and a cooling water passage in which the cooling water having a higher temperature flows when the Rankine cycle is operated than when the Rankine cycle is not operated.

An embodiment of the present invention and advantages thereof are described in detail below with reference to the accompanying drawings.

BRIEF DESCRIPTION OF DRAWINGS

FIG. 6 is a schematic diagram of the hybrid vehicle when viewed from below.

DESCRIPTION OF EMBODIMENTS

First Embodiment

Figure 1:
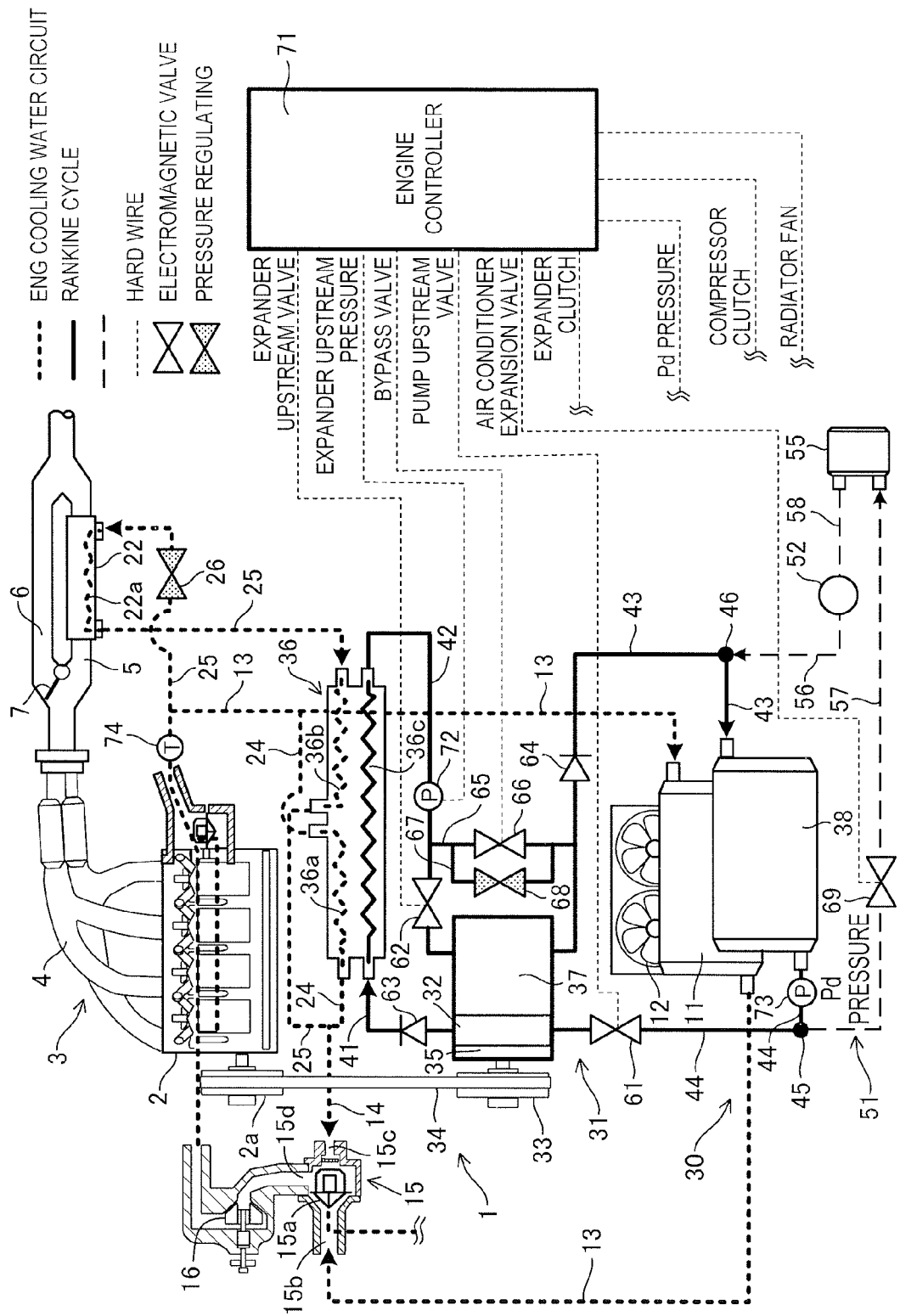
FIG. 1 is a schematic configuration diagram showing an entire system of a Rankine cycle of a first embodiment of the present invention.

FIG. 1 is a schematic configuration diagram showing an entire system of a Rankine cycle which is a premise of the present invention.

A Rankine cycle 31 and a refrigeration cycle 51 of FIG. 1 share refrigerant and a condenser 38. A cycle obtained by integrating the Rankine cycle 31 and the refrigeration cycle 51 is referred to as an integrated cycle 30 hereinafter. The integrated cycle 30 indicates an entire system including passages and the like for cooling water and exhaust gas in addition to passages in which the refrigerant of the Rankine cycle 31 and the refrigeration cycle 51 is circulated and constituent elements such as pumps, expanders and condensers provided at intermediate positions of the passages.

Figure 4:
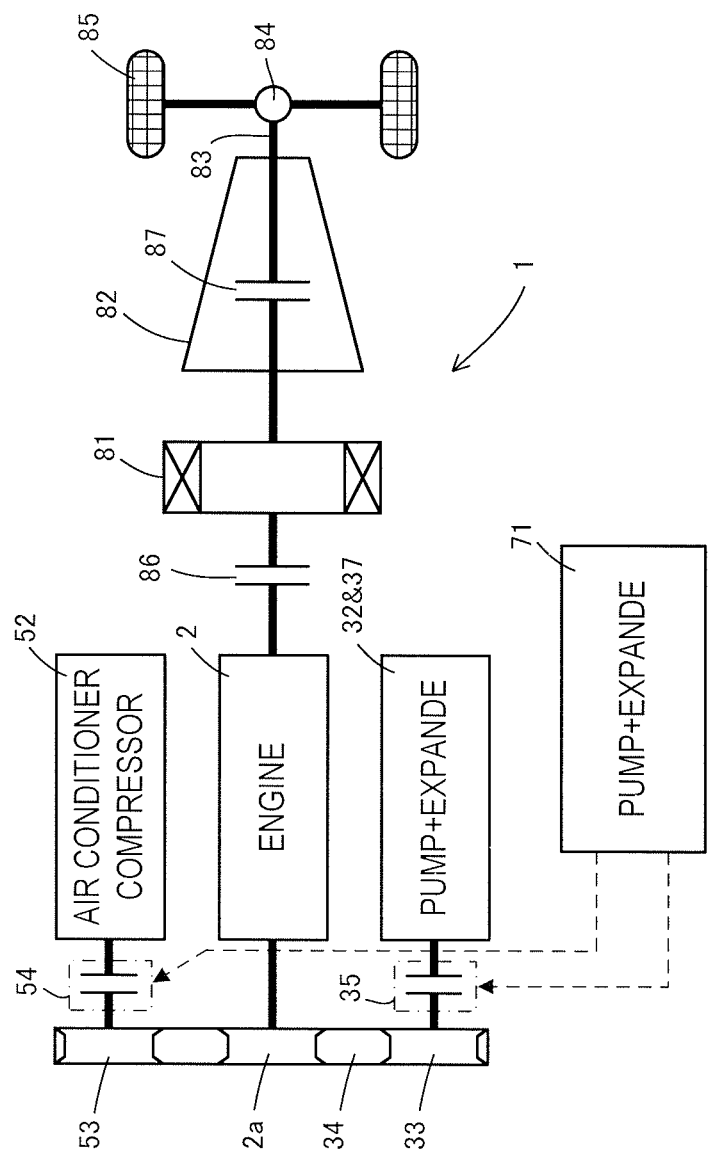
FIG. 4 is a schematic configuration diagram of a hybrid vehicle.

FIG. 4 is a schematic configuration diagram of a hybrid vehicle 1 in which the integrated cycle 30 is mounted.

In the hybrid vehicle 1, an engine 2, a motor generator 81 and an automatic transmission 82 are coupled in series. An output of the automatic transmission 82 is transmitted to drive wheels 85 via a propeller shaft 83 and a differential gear 84. A first drive shaft clutch 86 is provided between the engine 2 and the motor generator 81. Further, a second drive shaft clutch 87 is provided in the automatic transmission 82. This second drive shaft clutch 87 is one of frictional engagement elements of the automatic transmission 82.

Connection and disconnection (connected states) of the first and second drive shaft clutches 86, 87 are controlled by a command of an engine controller 71 according to a driving condition of a hybrid vehicle. When the hybrid vehicle 1 is in an EV running region where the efficiency of the engine 2 is poor as shown in FIG. 7B, the engine 2 is stopped, the first drive shaft clutch 86 is disconnected and the second drive shaft clutch 87 is connected, whereby the hybrid vehicle 1 runs only with a drive force of the motor generator 81.

When an engine rotation speed increases and a transition is made to a Rankine cycle operating region, the Rankine cycle 31 (to be described later) is operated by operating the engine 2.

As shown in FIG. 1, an exhaust passage 3 of the engine 2 includes an exhaust manifold 4, an exhaust pipe 5 and a bypass exhaust pipe 6. The exhaust pipe 5 is connected to a collection part of the exhaust manifold 4. The bypass exhaust pipe 6 is branched off at an intermediate position of the exhaust pipe 5 and joins the exhaust pipe 5 again. An waste-heat recovery device 22 is provided in a section of the exhaust pipe 5 bypassed by the bypass exhaust pipe 6. The waste-heat recovery device 22 performs heat exchange between exhaust gas and cooling water. A unit obtained by uniting the waste-heat recovery device 22 and the bypass exhaust pipe 6 is called an waste-heat recovery unit 23. As shown in FIG. 6, the waste-heat recovery unit 23 is arranged between an underfloor catalyst 88 and a sub-muffler 89.

Next, an engine cooling water passage is described based on FIG. 1. The engine cooling water passage includes a cooling water passage 13 passing through a radiator 11 and a bypass cooling water passage 14 bypassing the radiator 11. The bypass cooling water passage 14 includes a first bypass cooling water passage 24 and a second bypass cooling water passage 25. The first bypass cooling water passage 24 is branched off from the cooling water passage 13 and directly connected to a heat exchanger 36 to be described later. The second bypass cooling water passage 25 is branched off from the cooling water passage 13 and connected to the heat exchanger 36 by way of the waste-heat recovery device 22.

Next, the flow of engine cooling water is described based on FIG. 1. Cooling water coming out from the engine 2 has a temperature of about 80 to 90° C. The cooling water separately flows in the cooling water passage 13 and the bypass cooling water passage 14. Thereafter, two flows join again in a thermostat valve 15. The thermostat valve 15 is a three-way valve for controlling a flow rate of the cooling water supplied to the radiator 11 according to a cooling water temperature. The thermostat valve 15 is so structured that a valve main body 15a is built in a housing formed with two inlet ports (inlet ports 15b, 15c) and one outlet port 15d. The cooling water passage 13 is connected to the inlet port 15b. The bypass cooling water passage 14 is connected to the inlet port 15c. The thermostat valve 15 increases and decreases the flow rate of the cooling water supplied to the radiator 11 according to the cooling water temperature. In this way, the thermostat valve 15 determines an allocation of flow rates of the cooling water flowing in the cooling water passage 13 and the bypass cooling water passage 14. As a result, the cooling water temperature is properly maintained. The cooling water joined in the thermostat valve 15 is returned to the engine 2 by way of a cooling water pump 16.

Next, the heat exchanger 36 is described. The heat exchanger 36 performs heat exchange between the refrigerant of the Rankine cycle 31 and the cooling water. The heat exchanger 36 is formed by integrating a heater and a superheater. Specifically, in the heat exchanger 36, cooling water passages 36a, 36b are provided substantially in a row and adjacent to a refrigerant passage 36c of the Rankine cycle 31. Due to such a configuration, the refrigerant and the cooling water can exchange heat. Further, the cooling water passages 36a and 36b and the refrigerant passage 36c are so configured that the refrigerant of the Rankine cycle 31 and the cooling water flow in mutually opposite directions.

In detail, the cooling water passage 36a located on an upstream side (left side of FIG. 1) for the refrigerant of the Rankine cycle 31 is inserted in the first bypass cooling water passage 24. The cooling water coming out from the engine 2 is introduced to a heat exchanger left part formed by the cooling water passage 36a and a refrigerant passage part adjacent to this cooling water passage 36a. This part serves as a heater for heating the refrigerant flowing in the refrigerant passage 36c.

The cooling water having passed through the waste-heat recovery device 22 via the second bypass cooling water passage 25 is introduced to the cooling water passage 36b located on a downstream side (right side of FIG. 1) for the refrigerant of the Rankine cycle 31. The cooling water coming out from the engine 2 and heated by exhaust gas is introduced to a heat exchanger right part (downstream side for the refrigerant of the Rankine cycle 31) formed by the cooling water passage 36b and a refrigerant passage part adjacent to this cooling water passage 36b. This part serves as a superheater for overheating the refrigerant flowing in the refrigerant passage 36c.

A cooling water passage 22a of the waste-heat recovery device 22 is provided adjacent to the exhaust pipe 5. The cooling water coming out from the engine 2 and introduced to the cooling water passage 22a of the waste-heat recovery device 22 is heated, for example, up to 110 to 115° C. by the high-temperature exhaust gas. It should be noted that the cooling water passage 22a is so configured that the exhaust gas and the cooling water flow in mutually opposite directions.

A control valve 26 is disposed in the second bypass cooling water passage 25. Further, a cooling water temperature sensor 74 is provided at the exit of the engine 2. An opening of this control valve 26 is reduced when a temperature detected by the cooling water temperature sensor 74 reaches a predetermined value or higher so that an engine water temperature does not exceed a permissible temperature (e.g. 100° C.) for preventing, for example, efficiency deterioration of the engine and the occurrence of knocking. When the engine water temperature approaches the permissible temperature, an amount of the cooling water passing through the waste-heat recovery device 22 is reduced. This can reliably prevent the engine water temperature from exceeding the permissible temperature.

On the other hand, if the cooling water temperature increased in the waste-heat recovery device 22 becomes too high and the cooling water evaporates (boils) due to a reduction in the flow rate of the second bypass cooling water passage 25, efficiency in the heat exchanger 36 drops. Further, the flow of the cooling water in the cooling water passage may become poor and component temperatures may excessively increase. To avoid this, a thermostat valve 7 for controlling an amount of the exhaust gas passing through the waste-heat recovery device 22 and an amount of the exhaust gas passing through the bypass exhaust pipe 6 is provided in a branched part of the bypass exhaust pipe 6. A valve opening of the thermostat valve 7 is adjusted based on the temperature of the cooling water coming out from the waste-heat recovery device 22 so that the temperature of the cooling water coming out from the waste-heat recovery device 22 does not exceed a predetermined temperature (e.g. boiling temperature of 120°).

The heat exchanger 36, the thermostat valve 7 and the waste-heat recovery device 22 are united into the waste-heat recovery unit 23 and arranged at intermediate positions of the exhaust pipe under a substantially central part of a floor in a vehicle width direction. A relatively simple temperature sensitive valve using a bimetal or the like may be used as the thermostat valve 7. Further, a control valve controlled by a controller to which a temperature sensor output is input may be used as the thermostat valve 7. Since an adjustment of a heat exchange amount from the exhaust gas into the cooling water by the thermostat valve 7 is associated with a relatively long delay, it is difficult to prevent the engine water temperature from exceeding the permissible temperature if the thermostat valve 7 is singly adjusted. However, since the control valve 26 in the second bypass cooling water passage 25 is controlled based on the engine water temperature (exit temperature), a heat recovery amount can be quickly reduced to reliably prevent the engine water temperature from exceeding the permissible temperature. Further, if there is a margin between the engine water temperature and the permissible temperature, an waste-heat recovery amount can be increased by performing heat exchange until the temperature of the cooling water coming out from the waste-heat recovery device 22 reaches a high temperature (e.g. 110 to 115° C.) exceeding the permissible temperature of the engine water temperature. The cooling water coming out from the cooling water passage 36*b* joins the first bypass cooling water passage 24 via the second bypass cooling water passage 25.

Next, the integrated cycle 30 is described. The integrated cycle 30 is formed by integrating the Rankine cycle 31 and the refrigeration cycle 51 as described above. The Rankine cycle 31 as a basis is first described and the refrigeration cycle 51 is then described below.

The Rankine cycle 31 is a system for recovering the waste-heat of the engine 2 to the refrigerant through the cooling water of the engine 2 and regenerating the recovered waste-heat as power. The Rankine cycle 31 includes a refrigerant pump 32, the heat exchanger 36 as a superheater, an expander 37 and the condenser 38. These are connected by refrigerant passages 41 to 44 in which the refrigerant (R134a, etc.) is circulated.

Figure 2A:
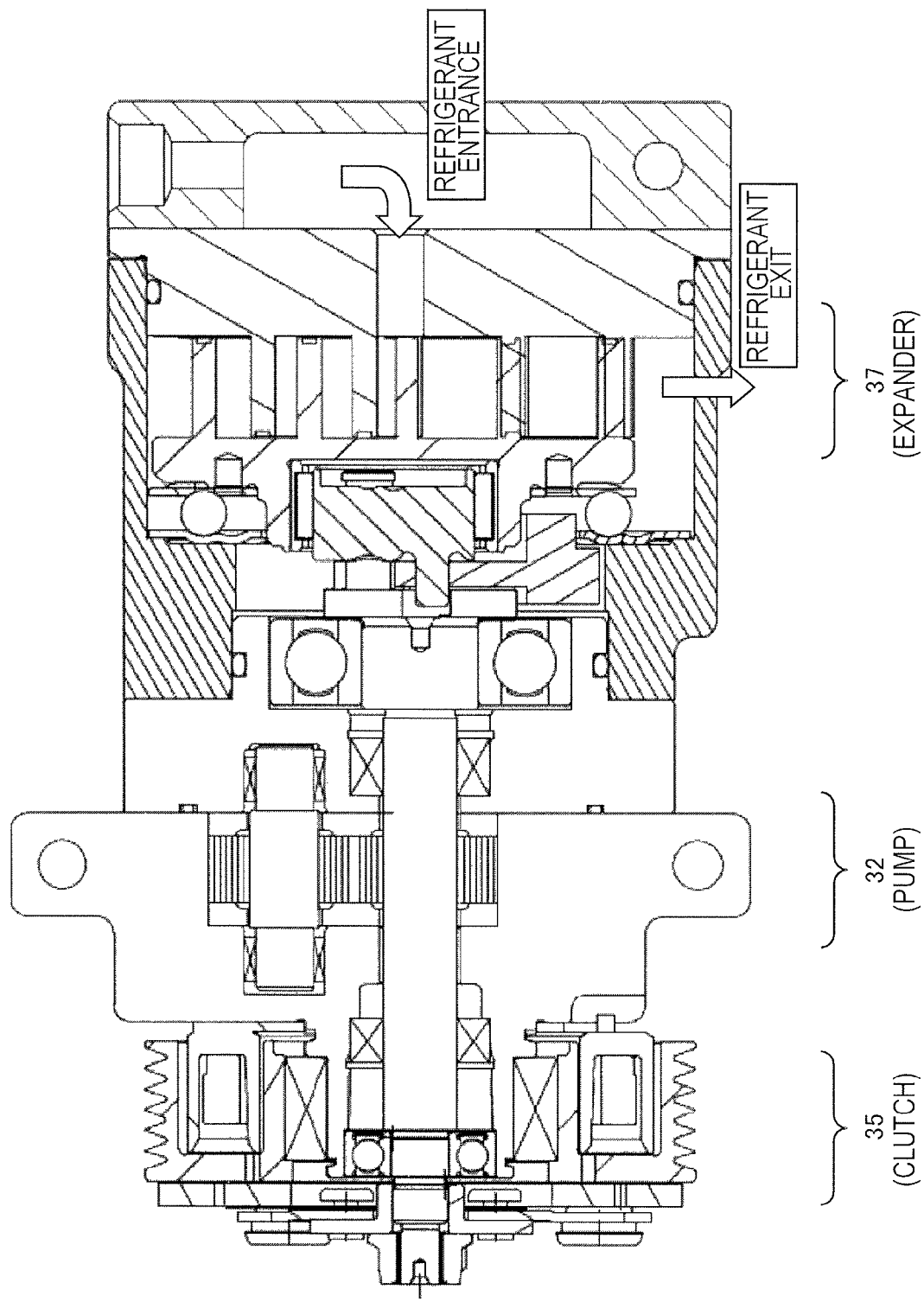
FIG. 2A is a schematic sectional view of an expander pump formed by uniting a pump and an expander.
Figure 2B:
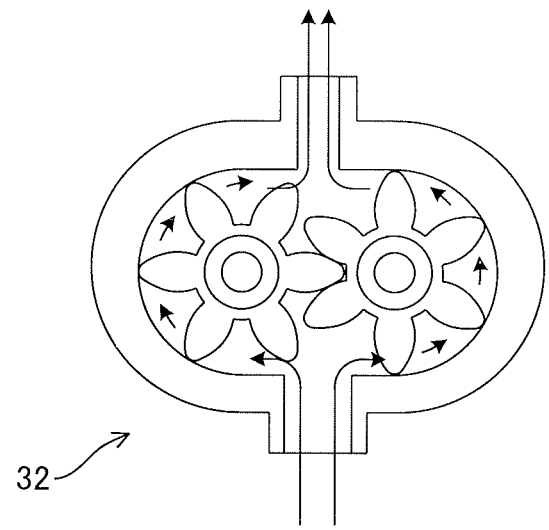
FIG. 2B is a schematic sectional view of a refrigerant pump.
Figure 2C:
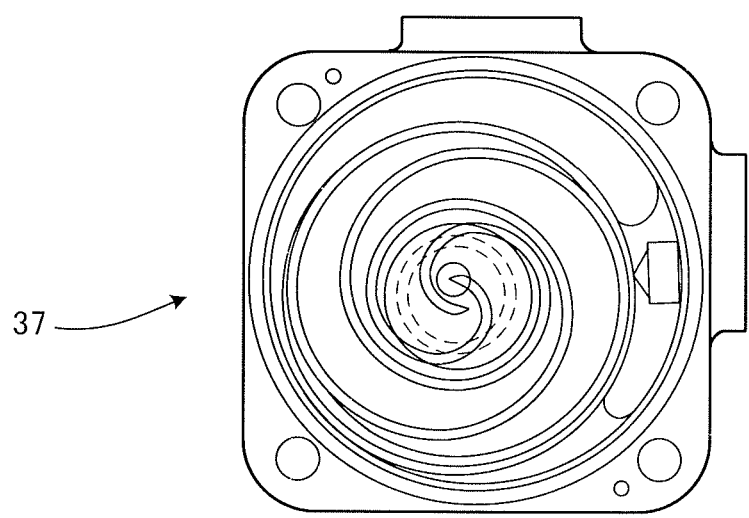
FIG. 2C is a schematic sectional view of the expander.

A shaft of the refrigerant pump 32 is arranged to be coupled to an output shaft of the expander 37 on the same axis (see FIG. 2A). The shaft of the refrigerant pump 32 and the output shaft of the expander 37 are arranged in parallel with an output shaft of the engine 2. A belt 34 is mounted between a pump pulley 33 provided on the tip of the shaft of the refrigerant pump 32 and a crank pulley 2*a* (see FIG. 1). Due to such a configuration, an output (power) generated by the expander 37 drives the refrigerant pump 32 and drives the output shaft (crankshaft) of the engine 2. It should be noted that the refrigerant pump 32 of the present embodiment is a gear-type pump as shown in FIG. 2B. The expander 37 is a scroll type expander as shown in FIG. 2C.

Further, an electromagnetic clutch (hereinafter, this clutch is referred to as an "expander clutch") 35 is provided between the pump pulley 33 and the refrigerant pump 32. Due to such a configuration, the refrigerant pump 32 and the expander 37 are connectable to and disconnectable from the engine 2 (see FIG. 2A). If the expander clutch 35 is connected when the output generated by the expander 37 exceeds a drive force of the refrigerant pump 32 and the friction of a rotating body and there is surplus power (when a predicted expander torque is positive), the rotation of the engine output shaft can be assisted by the surplus power of the expander 37. By assisting the rotation of the engine output shaft using energy obtained by waste-heat recovery in this way, fuel economy can be improved. Further, energy for driving the refrigerant pump 32 for circulating the refrigerant can also be generated using the recovered waste-heat.

The refrigerant from the refrigerant pump 32 is supplied to the heat exchanger 36 via the refrigerant passage 41. The heat exchanger 36 is a heat exchanger for performing heat exchange between the cooling water of the engine 2 and the refrigerant and evaporating and overheating the refrigerant.

The refrigerant from the heat exchanger 36 is supplied to the expander 37 via the refrigerant passage 42. The expander 37 is a steam turbine for converting heat into rotational energy by expanding the evaporated and overheated refrigerant. The power recovered by the expander 37 drives the refrigerant pump 32 and is transmitted to the engine 2 via a belt transmission mechanism to assist the rotation of the engine 2.

The refrigerant from the expander 37 is supplied to the condenser 38 via the refrigerant passage 43. The condenser 38 is a heat exchanger for performing heat exchange between outside air and the refrigerant and cooling and liquefying the refrigerant. The condenser 38 is arranged in parallel with the radiator 11 and cooled by a radiator fan 12.

The refrigerant liquefied by the condenser 38 is returned to the refrigerant pump 32 via the refrigerant passage 44. The refrigerant returned to the refrigerant pump 32 is fed to the heat exchanger 36 again by the refrigerant pump 32 and is circulated through each constituent element of the Rankine cycle 31.

Next, the refrigeration cycle 51 is described. Since the refrigeration cycle 51 shares the refrigerant circulating in the Rankine cycle 31, the refrigeration cycle 51 is integrated with the Rankine cycle 31 and the configuration thereof is simple. The refrigeration cycle 51 includes a compressor 52, the condenser 38 and an evaporator 55.

The compressor 52 is a fluid machine for compressing the refrigerant of the refrigeration cycle 51 at high temperature and high pressure. The compressor 52 is driven by the engine 2. As shown in FIG. 4, a compressor pulley 53 is fixed to a drive shaft of the compressor 52. The belt 34 is mounted on this compressor pulley 53 and the crank pulley 2*a*. A drive force of the engine 2 is transmitted to the compressor pulley 53 via this belt 34 to drive the compressor 52. Further, an electromagnetic clutch (hereinafter, this clutch is referred to as a "compressor clutch") 54 is provided between the compressor pulley 53 and the compressor 52. Due to such a configuration, the compressor 52 and the compressor pulley 53 are connectable to and disconnectable from each other.

Referring back to FIG. 1, the refrigerant from the compressor 52 is supplied to the condenser 38 after joining the refrigerant passage 43 via a refrigerant passage 56. The condenser 38 is a heat exchanger for condensing and liquefying the refrigerant by heat exchange with outside air. The liquid refrigerant from the condenser 38 is supplied to the evaporator 55 via a refrigerant passage 57 branched off from the refrigerant passage 44. The evaporator 55 is arranged in a case of an air conditioner unit in the same manner as a heater core. The evaporator 55 is a heat exchanger for evaporating the liquid refrigerant from the condenser 38 and cooling air conditioning air from a blower fan by latent heat of evaporation at that time.

The refrigerant evaporated by the evaporator 55 is returned to the compressor 52 via a refrigerant passage 58. It should be noted that a mixing ratio of the air conditioning air cooled by the evaporator 55 and that heated by the heater core is changed according to an opening of an air mix door to adjust the temperature to a temperature set by a passenger.

The integrated cycle 30 is composed of the Rankine cycle 31 and the refrigeration cycle 51 as described above. Various valves are provided at intermediate positions of the integrated cycle 30 to control the refrigerant flowing in the cycle. For example, to control the refrigerant circulating in the Rankine cycle 31, a pump upstream valve 61 is provided in the refrigerant passage 44 allowing communication between a refrigeration cycle junction 45 and the refrigerant pump 32 and an expander upstream valve 62 is provided in the refrigerant passage 42 allowing communication between the heat exchanger 36 and the expander 37. Further, a check valve 63 for preventing a reverse flow of the refrigerant from the heat exchanger 36 to the refrigerant pump 32 is provided in the refrigerant passage 41 allowing communication between the refrigerant pump 32 and the heat exchanger 36. A check valve 64 for preventing a reverse flow of the refrigerant from a refrigeration cycle junction 46 to the expander 37 is provided in the refrigerant passage 43 allowing communication between the expander 37 and the refrigeration cycle junction 46. Further, an expander bypass passage 65 is provided which bypasses the expander 37 from a side upstream of the expander upstream valve 62 and joins at a side upstream of the check valve 64, and a bypass valve 66 is provided in this expander bypass passage 65. Furthermore, a pressure regulating valve 68 is provided in a passage 67 bypassing the bypass valve 66. In the refrigeration cycle 51, an air conditioner expansion valve 69 is provided in the refrigerant passage 57 connecting the refrigeration cycle junction 45 and the evaporator 55.

Any of the pump upstream valve 61, the expander upstream valve 62, the bypass valve 66 and the air conditioner expansion valve 69 is an electromagnetic on-off valve. To the engine controller 71 are input a signal indicating an expander upstream pressure detected by a pressure sensor 72, a signal indicating a refrigerant pressure Pd at the exit of the condenser 38 detected by a pressure sensor 73, a rotation speed signal of the expander 37, etc. In the engine controller 71, the compressor 52 of the refrigeration cycle 51 and the radiator fan 12 are controlled and the opening and closing of the pump upstream valve 61, the expander upstream valve 62, the bypass valve 66 and the air conditioner expansion valve 69 are controlled based on each of these input signals according to a predetermined driving condition.

For example, an expander torque (regenerative power) is predicted based on the expander upstream pressure detected by the pressure sensor 72 and the expander rotation speed, and the expander clutch 35 is engaged when this predicted expander torque is positive (the rotation of the engine output shaft can be assisted) and released when the predicted expander torque is zero or negative. Prediction based on the sensor detected pressure and the expander rotation speed has higher accuracy than that based on the exhaust temperature. Thus, the expander clutch 35 can be properly engaged/released according to a generation state of the expander torque (for further details, see JP2010-190185A).

Figure 3:
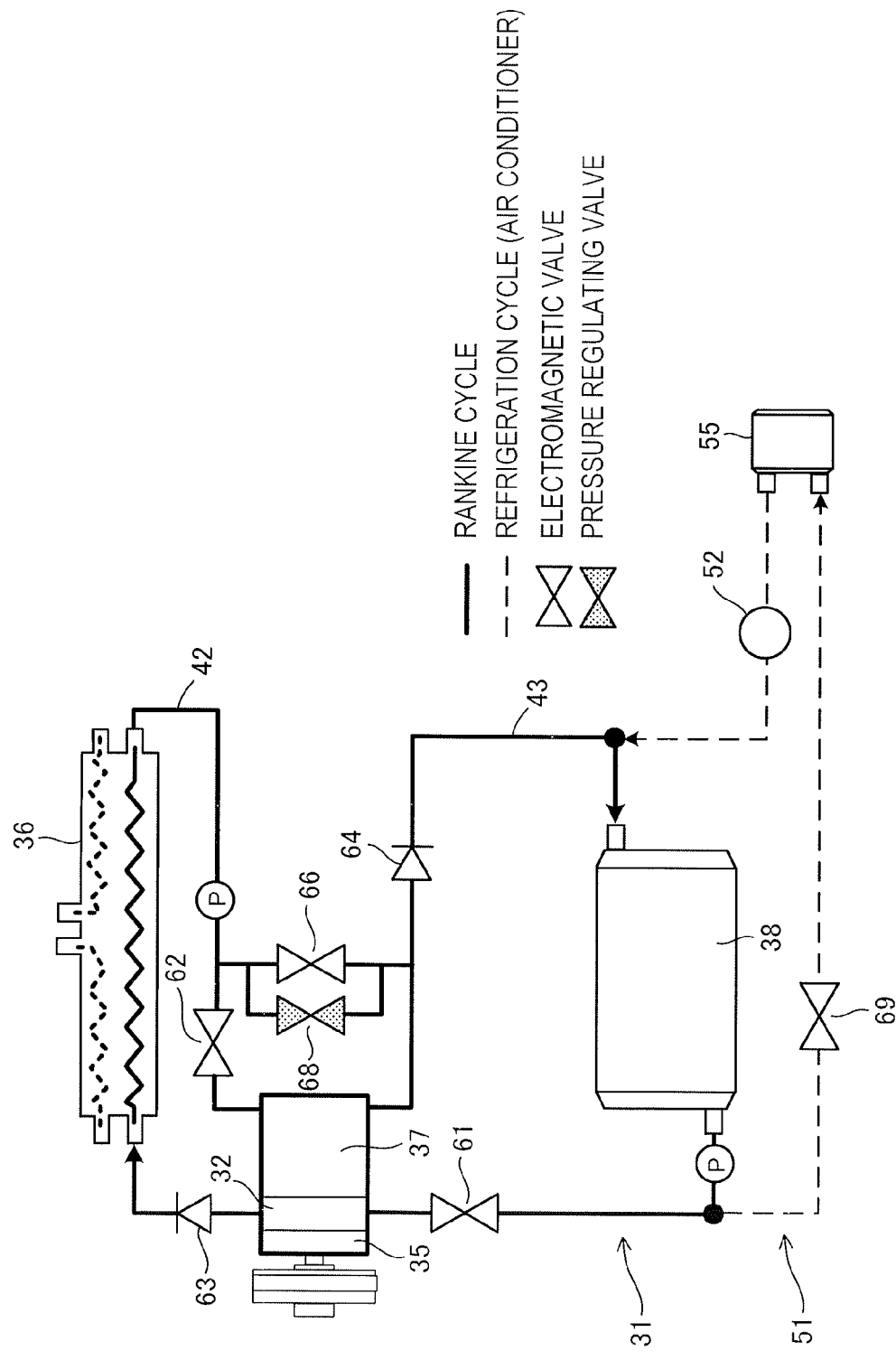
FIG. 3 is a schematic diagram showing functions of refrigerant system valves.

The above four on-off valves (pump upstream valve 61, expander upstream valve 62, bypass valve 66, and air conditioner expansion valve 69) and two check valves (check valves 63, 64) are refrigerant system valves. Functions of these refrigerant system valves are shown anew in FIG. 3.

The pump upstream valve 61 prevents an uneven distribution of the refrigerant (containing a lubricant component) to the Rankine cycle 31 by being closed under a predetermined condition that makes the refrigerant easily unevenly distributed to the Rankine cycle 31 as compared with the refrigeration cycle 51. The pump upstream valve 61 closes the Rankine cycle 31 in cooperation with the check valve 64 downstream of the expander 37 as described later. The expander upstream valve 62 cuts off the refrigerant passage 42 to maintain the refrigerant from the heat exchanger 36 until a high pressure is reached when a refrigerant pressure from the heat exchanger 36 is relatively low. This can prompt the heating of the refrigerant even if the expander torque cannot be sufficiently obtained and can shorten, for example, a time until the Rankine cycle 31 is restarted, i.e. a time until regeneration actually becomes possible. The bypass valve 66 shortens a start-up time of the Rankine cycle 31 by being opened to actuate the refrigerant pump 32 after the expander 37 is bypassed such as when an amount of the refrigerant present on the side of the Rankine cycle 31 is insufficient such as at the start-up of the Rankine cycle 31. If a state where the refrigerant temperature at the exit of the condenser 38 or at the entrance of the refrigerant pump 32 is reduced from a boiling point in consideration of a pressure at that location by a predetermined temperature difference (subcool temperature SC) or more is realized by actuating the refrigerant pump 32 after the expander 37 is bypassed, a state is prepared where the liquid refrigerant can be sufficiently supplied to the Rankine cycle 31.

The check valve 63 upstream of the heat exchanger 36 maintains the refrigerant supplied to the expander 37 at a high pressure in cooperation with the bypass valve 66, the pressure regulating valve 68 and the expander upstream valve 62. Under a condition that regeneration efficiency of the Rankine cycle 31 is low, the operation of the Rankine cycle 31 is stopped and the refrigerant pressure during the stop is increased by closing a section before and after the heat exchanger 36, so that the Rankine cycle 31 can be quickly restarted utilizing the high-pressure refrigerant. The pressure regulating valve 68 functions as a relief valve for allowing the refrigerant having reached an excessively high pressure to escape by being opened when the pressure of the refrigerant supplied to the expander 37 becomes excessively high.

The check valve 64 downstream of the expander 37 prevents an uneven distribution of the refrigerant to the Rankine cycle 31 in cooperation with the aforementioned pump upstream valve 61. If the engine 2 is not warm yet immediately after the operation of the hybrid vehicle 1 is started, the temperature of the Rankine cycle 31 is lower than that of the refrigeration cycle 51 and the refrigerant may be unevenly distributed toward the Rankine cycle 31. A probability of uneven distribution toward the Rankine cycle 31 is not high. However, since it is desired to quickly cool vehicle interior, for example, immediately after the start of the vehicle operation in summer, cooling capacity is required most. In such a situation, it is desired to ensure the refrigerant of the refrigeration cycle 51 by resolving even a slightly uneven distribution of the refrigerant. Accordingly, the check valve 64 is provided to prevent the uneven distribution of the refrigerant toward the Rankine cycle 31.

The compressor 52 is not so structured that the refrigerant can freely pass when the drive is stopped. The compressor 52 can prevent an uneven distribution of the refrigerant to the refrigeration cycle 51 in cooperation with the air conditioner expansion valve 69. This is described. When the operation of the refrigeration cycle 51 is stopped, the refrigerant moves from the Rankine cycle 31 that is in steady operation and has a relatively high temperature to the refrigeration cycle 51, whereby the refrigerant circulating in the Rankine cycle 31 may become insufficient. In the refrigeration cycle 51, the temperature of the evaporator 55 is low immediately after the cooling is stopped and the refrigerant tends to stay in the evaporator 55 that has a relatively large volume and a low temperature. In this case, the uneven distribution of the refrigerant to the refrigeration cycle 51 can be prevented by stopping the drive of the compressor 52 to block a movement of the refrigerant from the condenser 38 to the evaporator 55 and closing the air conditioner expansion valve 69.

Figure 5:
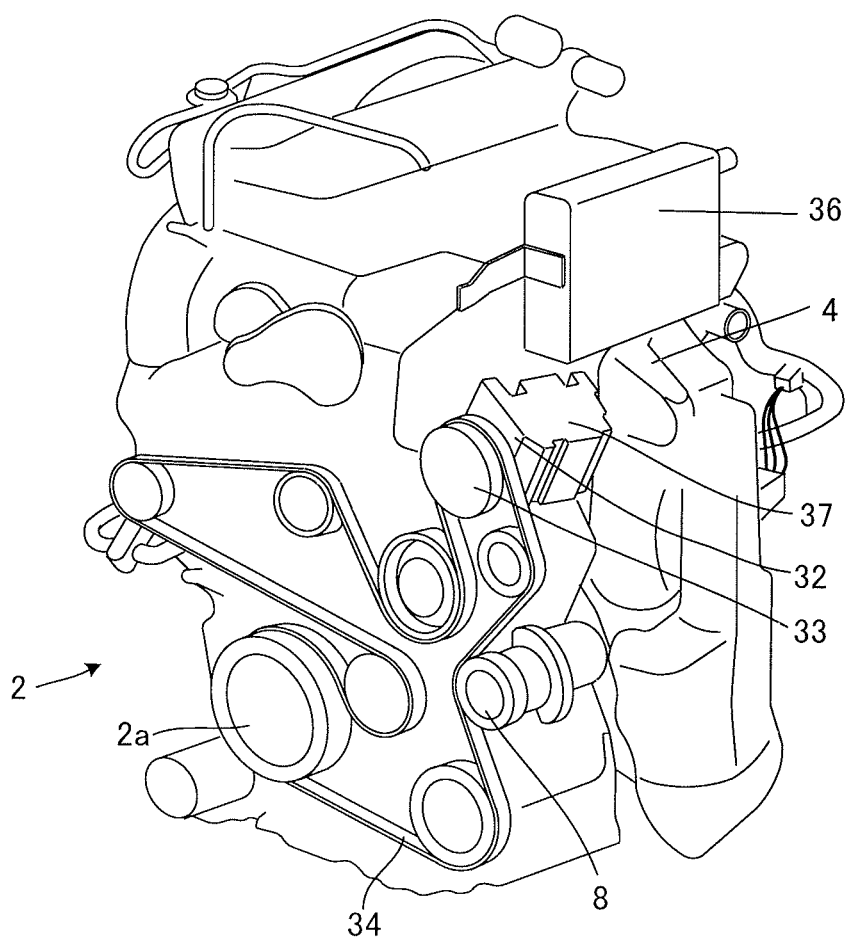
FIG. 5 is a schematic perspective view of an engine.

Next, FIG. 5 is a schematic perspective view of the engine 2 showing an entire package of the engine 2. What is characteristic in FIG. 5 is that the heat exchanger 36 is arranged vertically above the exhaust manifold 4. By arranging the heat exchanger 36 in a space vertically above the exhaust manifold 4, the mountability of the Rankine cycle 31 on the engine 2 is improved. Further, a tension pulley 8 is provided on the engine 2.

Next, a basic operation method of the Rankine cycle 31 is described with reference to FIGS. 7A and 7B.

Figure 7A:
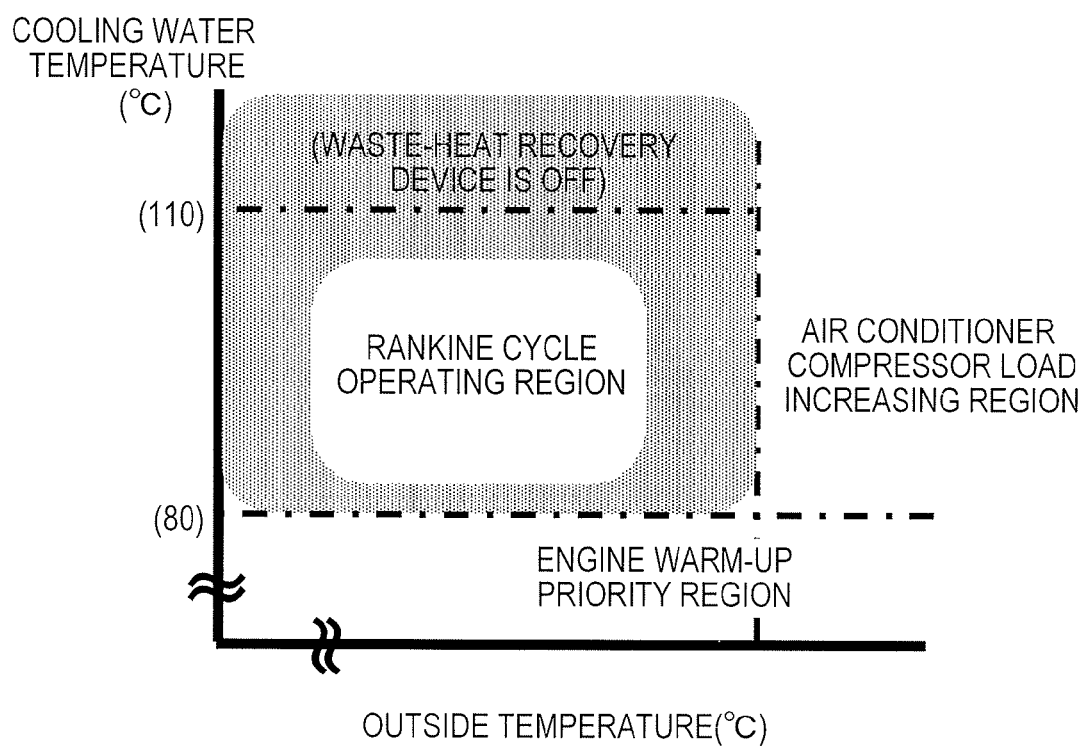
FIG. 7A is a characteristic graph of a Rankine cycle operating region.
Figure 7B:
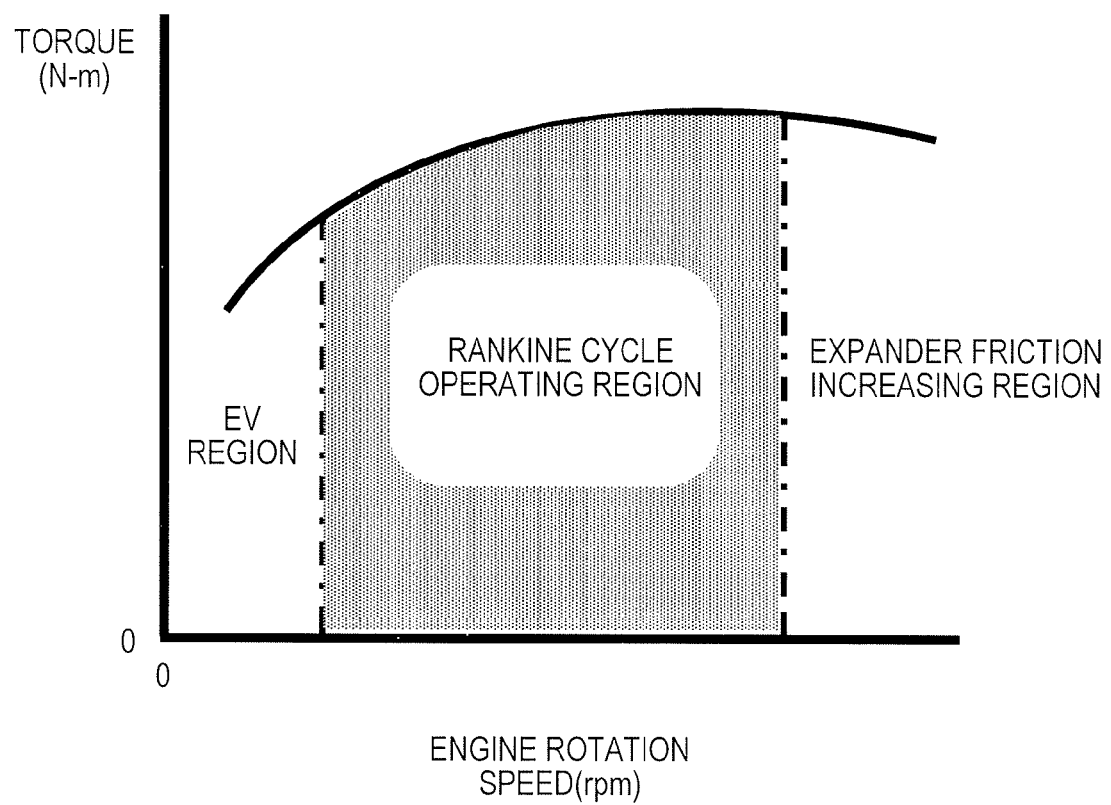
FIG. 7B is a characteristic graph of a Rankine cycle operating region.

First, FIGS. 7A and 7B are graphs showing operating regions of the Rankine cycle 31. A horizontal axis of FIG. 7A represents outside air temperature and a vertical axis represents engine water temperature (cooling water temperature). A horizontal axis of FIG. 7B represents engine rotation speed and a vertical axis represents engine torque (engine load).

The Rankine cycle 31 is operated when both conditions of FIGS. 7A and 7B are satisfied. In FIG. 7A, the operation of the Rankine cycle 31 is stopped in a region on a low water temperature side where the warm-up of the engine 2 is prioritized and a region on a high outside temperature side where a load of the compressor 52 increases. During a warm-up period in which exhaust temperature is low and recovery efficiency is poor, the cooling water temperature is quickly increased rather by not operating the Rankine cycle 31. During a high outside temperature period in which high cooling capacity is required, the Rankine cycle 31 is stopped to provide the refrigeration cycle 51 with sufficient refrigerant and the cooling capacity of the condenser 38. In FIG. 7B, the operation of the Rankine cycle 31 is stopped in the EV running region and a region on a high rotation speed side where the friction of the expander 37 increases since the vehicle is a hybrid vehicle. Since it is difficult to provide the expander 37 with a highly efficient structure having little friction at all the rotation speeds, the expander 37 is so configured (dimensions and the like of each part of the expander 37 are so set) in the case of FIG. 7B as to realize small friction and high efficiency in an engine rotation speed region where an operation frequency is high.

Figure 8:
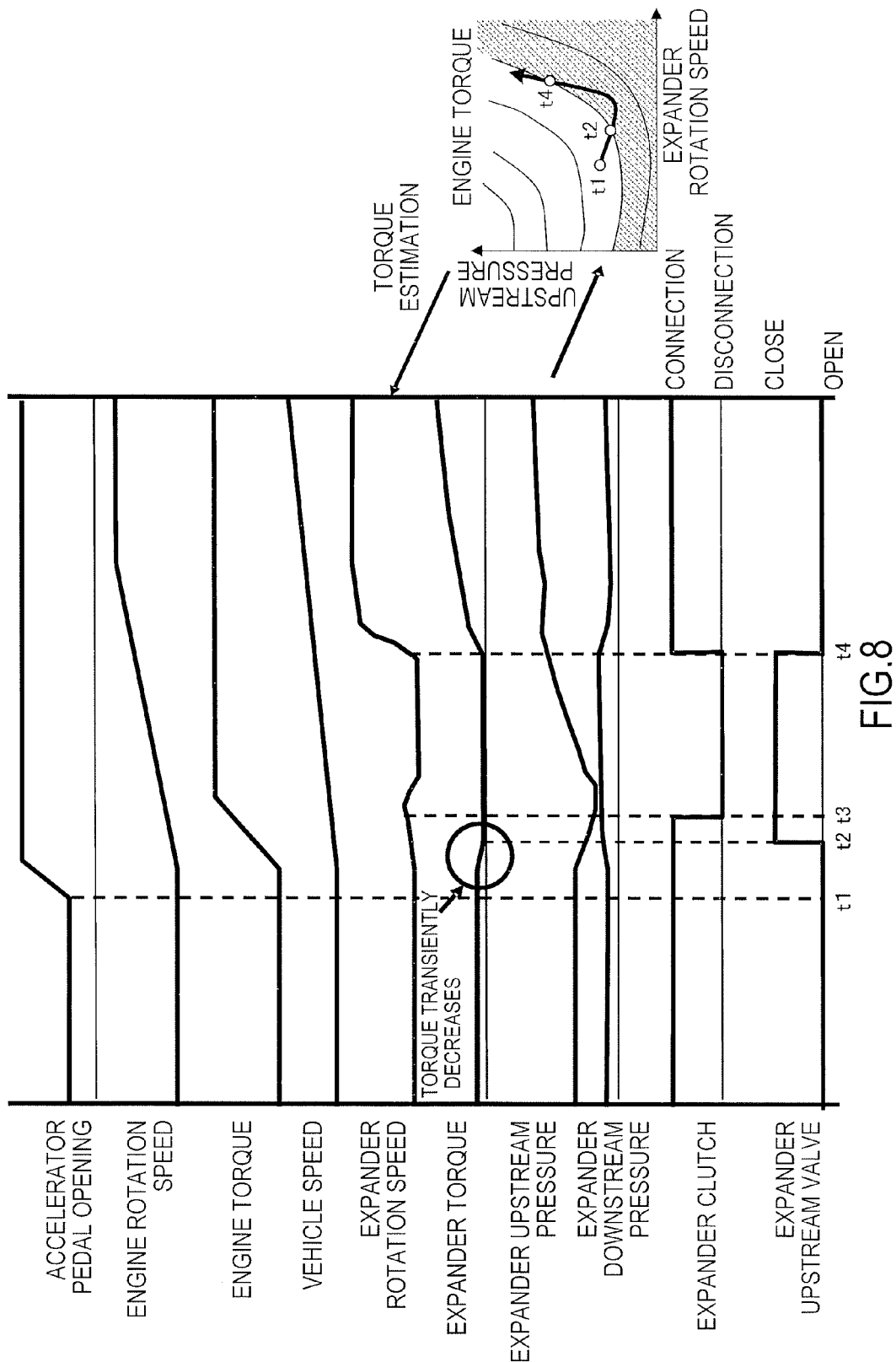
FIG. 8 is a timing chart showing a state where the hybrid vehicle 1 is accelerated while the rotation of an engine output shaft is assisted by an expander torque.

FIG. 8 is a timing chart showing, by modeling, a state where the hybrid vehicle 1 is accelerated while the rotation of the engine output shaft is assisted by the expander torque. It should be noted that a transition of an operating state of the expander 37 at this time is shown on an expander torque map on the right side of FIG. 8. The expander torque tends to become highest in ranges (left upper ranges) where the expander rotation speed is low and the expander upstream pressure is high out of ranges separated by contour lines of the expander torque map. The expander torque tends to become smaller with an increase in the expander rotation speed and a reduction in the expander upstream pressure (toward a right lower side). Particularly, hatched ranges are an area where the expander torque is negative and becomes a load for the engine on the assumption that the refrigerant pump is driven.

Until t1 at which a driver depresses an accelerator pedal, steady speed running is continued, the expander 37 generates a positive torque and the rotation of the engine output shaft is assisted by the expander torque.

After t1, an increase in the exhaust temperature or the cooling water temperature is delayed with respect to an increase in the engine rotation speed while the rotation speed of the expander 37, i.e. the rotation speed of the refrigerant pump 32 increases in proportion to the engine rotation speed. Thus, a ratio of a recoverable heat amount to an amount of the refrigerant increased by an increase in the rotation speed of the refrigerant pump 32 decreases.

Accordingly, with an increase in the expander rotation speed, the refrigerant pressure upstream of the expander decreases and the expander torque decreases.

If the expander torque is no longer sufficiently obtained due to this reduction in the expander torque (e.g. at timing t2 at which the expander torque becomes nearly zero), deterioration in regeneration efficiency is avoided by switching the expander upstream valve 62 from an open state to a closed state. Specifically, a phenomenon in which the expander 37 is, on the contrary, dragged by the engine 2 with an excessive reduction in the expander torque is avoided.

After the expander upstream valve 62 is switched from the open state to the closed state, the expander clutch 35 is switched from a connected state (engaged state) to a disconnected state (released state) at timing t3. The refrigerant pressure upstream of the expander is sufficiently reduced by somewhat delaying this disconnection timing of the expander clutch 35 from a timing at which the expander upstream valve 62 is switched from the open state to the closed state. This prevents the expander 37 from being excessively rotated when the expander clutch 35 is disconnected. Further, a relatively large amount of the refrigerant is supplied into the heat exchanger 36 by the refrigerant pump 32 and the refrigerant is effectively heated also during the stop of the Rankine cycle 31, whereby the operation of the Rankine cycle 31 can be smoothly resumed.

After t3, the expander upstream pressure increases again due to an increase in a heat radiation amount of the engine 2. At timing t4, the expander upstream valve 62 is switched from the closed state to the open state and the supply of the refrigerant to the expander 37 is resumed. Further, the expander clutch 35 is connected again at t4. By this reconnection of the expander clutch 35, the rotation assist of the engine output shaft by the expander torque is resumed.

Figure 9:
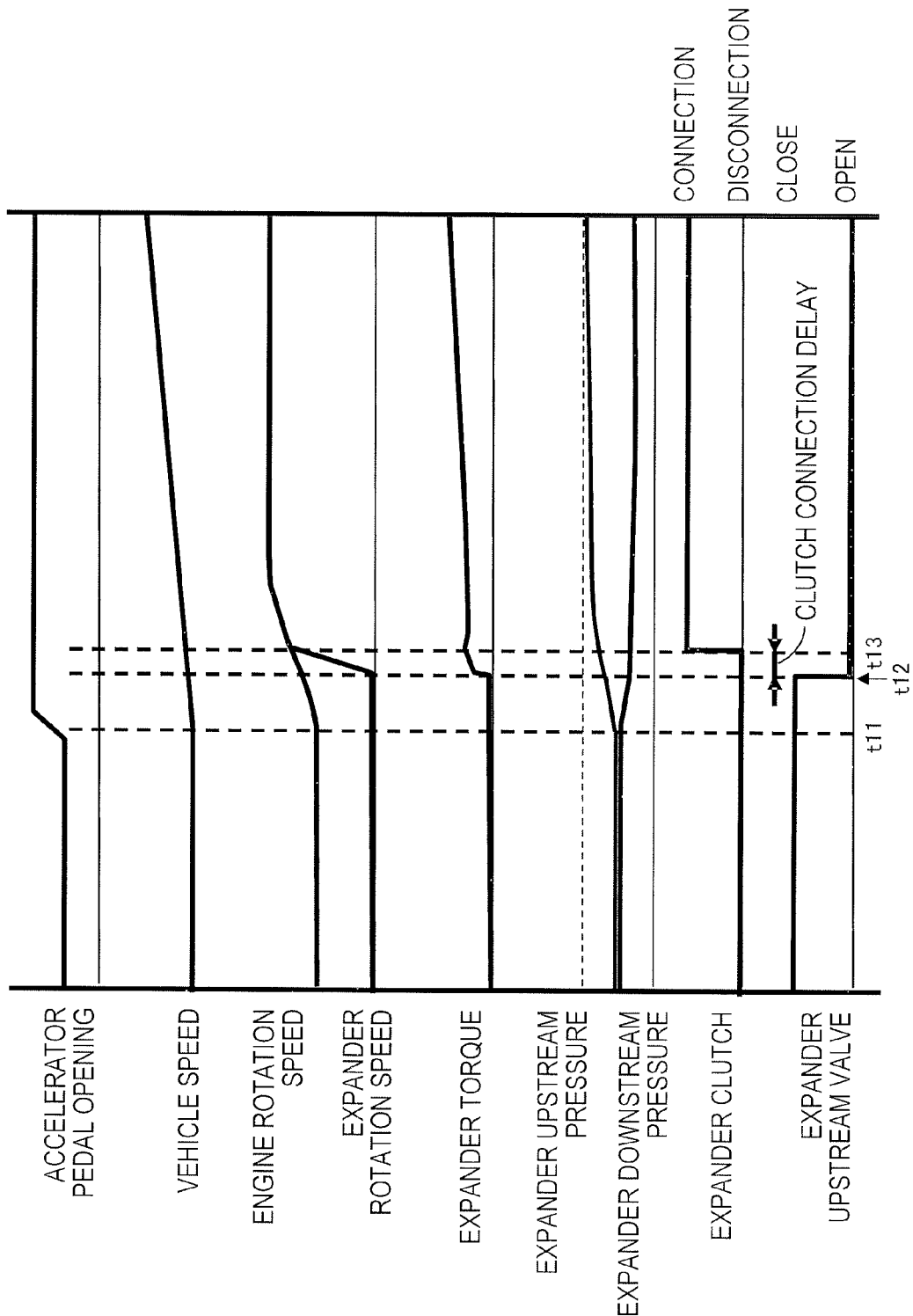
FIG. 9 is a timing chart showing a state where a restart is made after the operation of the Rankine cycle is stopped.

FIG. 9 is a timing chart showing, by modeling, a state where the Rankine cycle 31 is restarted in a manner different from that in FIG. 8 (control at t4) after the operation of the Rankine cycle is stopped with the expander upstream valve 62 closed and the expander clutch 35 disconnected.

An accelerator pedal opening increases when the driver depresses the accelerator pedal at timing t11. At t11, the Rankine cycle 31 is not operated. Thus, the expander torque is kept zero.

The heat radiation amount of the engine 2 increases with an increase in the engine rotation speed from t11, and the temperature of the cooling water flowing into the heat exchanger 36 increases and the temperature of the refrigerant in the heat exchanger 36 increases due to this increase in the heat radiation amount. Since the expander upstream valve 62 is closed, the refrigerant pressure upstream of the expander upstream valve 62, i.e. the expander upstream pressure increases (t11 to t12) due to this increase in the refrigerant temperature by the heat exchanger 36.

A switch is made from a Rankine cycle non-operating region to the Rankine cycle operating region by this change in the operating state. If the expander upstream valve 62 is not provided and the expander clutch 35 is immediately switched from the disconnected state to the connected state to couple the expander 37 to the engine output shaft when a transition is made to the Rankine cycle operating region, the expander 37 becomes a load for the engine 2 and, in addition, a torque shock occurs.

On the other hand, in FIG. 9, the expander upstream valve 62 is not immediately switched from the closed state to the open state when a switch is made to the Rankine cycle operating region. Specifically, the expander upstream valve 62 is kept closed even after a transition is made to the Rankine cycle operating region.

Eventually, a differential pressure between the expander upstream pressure and an expander downstream pressure increases, it is judged that the expander 37 can be operated (driven) at timing t12 at which the differential pressure reaches a predetermined pressure or higher, and the expander upstream valve 62 is switched from the closed state to the open state. By this switch of the expander upstream valve 62 to the open state, the refrigerant of a predetermined pressure is supplied to the expander 37 and the expander rotation speed quickly increases from zero.

The expander clutch 35 is switched from the disconnected state to the connected state at timing t13 at which the expander rotation speed reaches the engine rotation speed due to this increase in the expander rotation speed. If the expander clutch 35 is connected before the rotation speed of the expander 37 is sufficiently increased, the expander 37 becomes an engine load and a torque shock possibly occurs. Contrary to this, by connecting the expander clutch 35 with a delay at t13 at which there is no rotation speed difference from the rotation speed of the engine output shaft, it can be prevented that the expander 37 becomes an engine load and a torque shock occurs in association with the engagement of the expander clutch 35.

Figure 10:
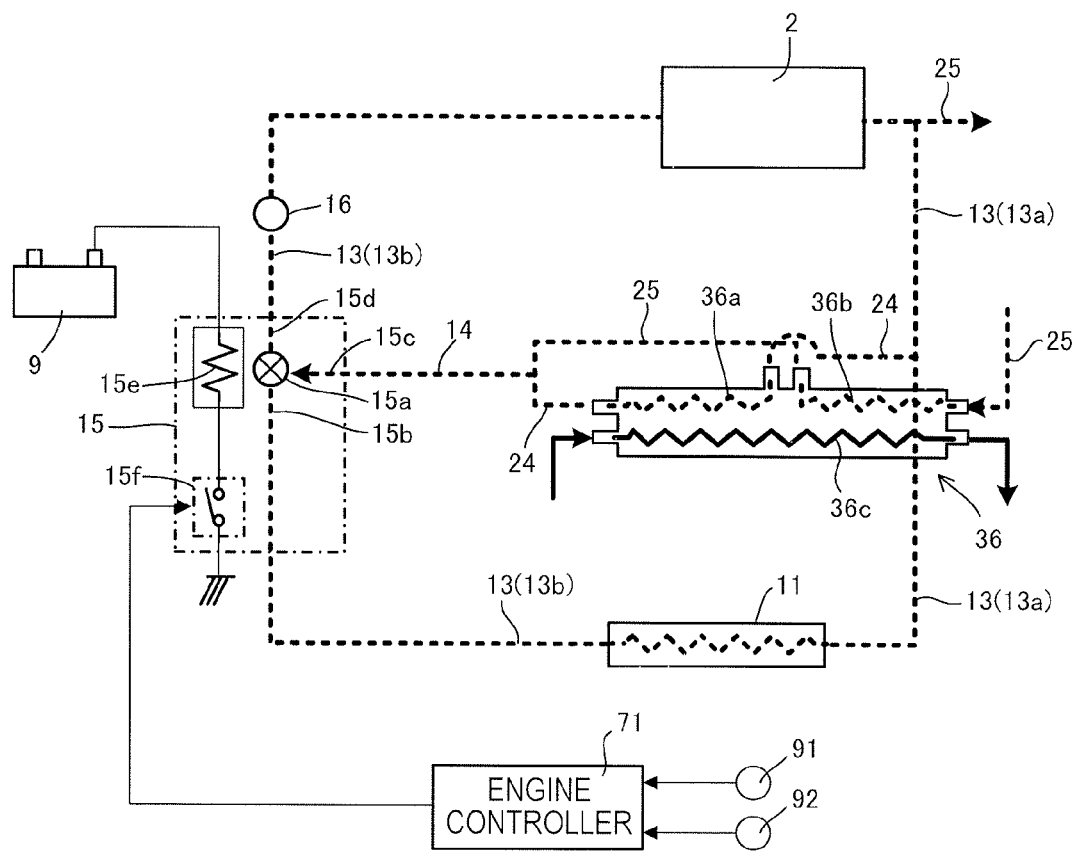
FIG. 10 is a schematic diagram extractively showing mainly an engine cooling water circuit from FIG. 1.

FIG. 10 is a schematic diagram extractively showing mainly an engine cooling water circuit from FIG. 1. The same components as in FIG. 1 are denoted by the same reference signs.

The cooling water passage 13 passes through the radiator 11. The cooling water passage 13 includes a first cooling water passage 13a and a second cooling water passage 13b. The first cooling water passage 13a supplies the cooling water refrigerant heated by cooling the engine 2 to the radiator 11. The second cooling water passage 13b returns the cooling water coming out from the radiator 11 to the engine 2. The bypass cooling water passage 14 bypasses the radiator 11 and joins the second cooling water passage 13b.

Figure 13:
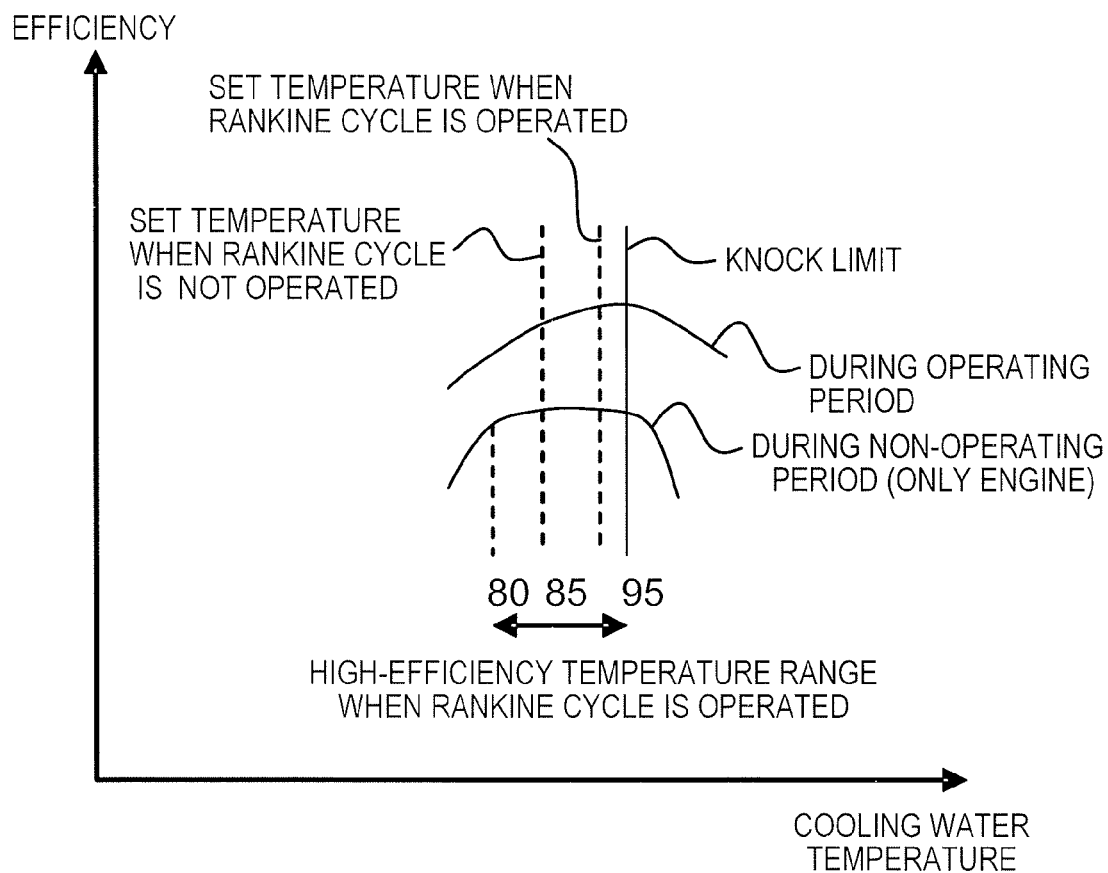
FIG. 13 is a graph showing that a cooling water temperature when efficiency is highest differs between when the Rankine cycle is operated and when the Rankine cycle is not operated.

The cooling water temperature when efficiency is highest differs depending on whether the Rankine cycle is operated or not operated. This is described with reference to FIG. 13. A horizontal axis of FIG. 13 represents engine cooling water temperature. A vertical axis represents efficiency (ratio extractable as a work from a heat generation amount of consumed fuel). FIG. 13 shows a correlation between the cooling water temperature and the efficiency when the Rankine cycle is operated under predetermined engine operating conditions (e.g. predetermined load and number of revolutions) and also shows a correlation between the cooling water temperature and the efficiency when the Rankine cycle is not operated under the same engine operating conditions.

As shown in FIG. 13, the efficiency is highest in a range of 80° C. to 95° C. when the Rankine cycle is not operated. Accordingly, the cooling water temperature is preferably at a temperature near a center (e.g. 85° C.) so that high efficiency is maintained even if the temperature slightly changes. On the other hand, when the Rankine cycle is operated, the efficiency is improved at a higher temperature side than when the Rankine cycle is not operated. This is because a cooling loss or an exhaust loss is reduced by recovering waste-heat if the Rankine cycle is operated. Thus, the cooling water is desirably set at a relatively high temperature (temperature higher than 85° C.) at least in a range where the engine does not knock.

As just described, even under the same engine operating conditions, efficiency as a whole is enhanced by setting the cooling water temperature when the Rankine cycle is operated higher than the cooling water temperature when the Rankine cycle is not operated.

As just described, heat recovery efficiency of the expander 37 is improved with an increase in the temperature and the pressure of the gas refrigerant coming out from the exit of the heat exchanger 36. Accordingly, the present inventors conceived to set the cooling water temperature as high as possible in a range where knocking is suppressed.

Conventionally, there is a device in which a mechanical thermostat valve is provided at a location where the cooling water passage 13 and the bypass cooling water passage 14 join. Here, description is made with the thermostat valve of FIG. 1 replaced by the mechanical thermostat valve so that this conventional device can be easily understood.

For example, when the temperature of the cooling water is low such as at engine cold start, the efficiency of the engine 2 is better if the engine 2 is warmed up. Accordingly, in this case, the valve main body 15a blocks the inlet port 15b to allow communication between the inlet port 15c and the outlet port 15d. Then, the cooling water flows into the bypass cooling water passage 14, but does not flow into the radiator 11.

On the other hand, when the temperature of the cooling water is high such as in a high load, it is necessary to avoid knocking. Accordingly, in this case, the valve main body 15a opens the inlet port 15b to allow communication between the inlet port 15b and the outlet port 15d. Then, the cooling water flows into the radiator 11. Then, the cooling water cooled in the radiator 11 is supplied to the engine 2. As a result, the engine 2 is cooled.

It should be noted that an opening of a thermostat valve normally increases with an increase in a cooling water temperature when the cooling water temperature is in a predetermined temperature range. The amount of the cooling water flowing toward a radiator increases if the opening of the thermostat valve increases.

In the conventional device, one valve opening temperature (temperature of the flow toward the radiator) of the thermostat valve is determined exclusively to improve thermal efficiency of the engine 2. There is no disclosure as to whether or not the cooling water temperature is changed depending on whether the Rankine cycle is operated or not operated. It should be noted that the valve opening temperature of the thermostat valve is a temperature at which the thermostat valve is set to a valve opening state. The valve opening temperature of the thermostat valve means a typical temperature such as a temperature at which the thermostat valve starts opening, a temperature at which the thermostat valve is fully opened or an average temperature of these.

Contrary to this, in the first embodiment, the electronically controlled thermostat valve 15 is used instead of the mechanical thermostat valve. By doing so, the cooling water temperature can be increased in accordance with the operation of the Rankine cycle 31. A valve opening temperature of the electronically controlled thermostat valve 15 is arbitrarily set unlike the mechanical thermostat valve. However, other than that, the thermostat valve 15 is the same as the mechanical thermostat valve. Specifically, in a valve closing state, the valve main body 15a blocks the inlet port 15b to allow communication between the inlet port 15c and the outlet port 15d. Then, the cooling water flows into the bypass cooling water passage 14, but does not flow into the radiator 11. Further, in a valve opening state, the inlet port 15b and the outlet port 15d are allowed to communicate. Then, the cooling water flows into the radiator 11.

The electronically controlled thermostat valve 15 is controlled by the engine controller 71. The valve opening temperature when the Rankine cycle 31 is operated is set higher than that when the Rankine cycle 31 is not operated.

It should be noted that a valve opening temperature of a thermostat valve is a temperature at which the thermostat valve is set to a valve opening state and means a typical temperature such as a temperature at which the thermostat valve starts opening, a temperature at which the thermostat valve is fully opened or an average temperature of these. This is the same as with the thermostat valve of the conventional device.

Next, the valve opening temperature of the electronically controlled thermostat valve 15 is described with reference to FIG. 11.

Figure 11:
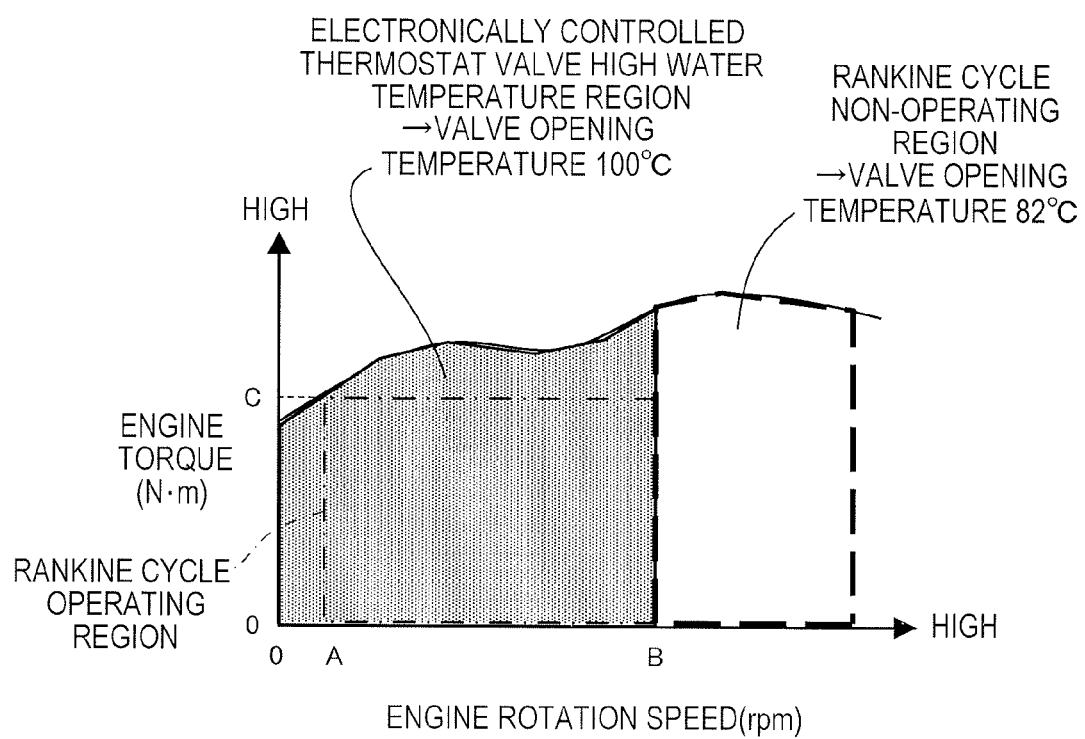
FIG. 11 is a characteristic graph showing a Rankine cycle operating region and a Rankine cycle non-operating region.

FIG. 11 is a characteristic graph of an operating region and a non-operating region of the Rankine cycle 31 and basically the same as FIG. 7B. In FIG. 11, a rectangular region shown in dashed-dotted line is the Rankine cycle operating region. The other region is the Rankine cycle non-operating region.

Reasons why the operating region and non-operating region of the Rankine cycle 31 are determined in this way are described in the following <1> to <4>.

<1> The cooling water is set at a high temperature in the Rankine cycle operating region (rotation speed range where the rotation speed is at least not higher than a predetermined value B). If the cooling water is set at a high temperature, an engine friction and a cooling loss are reduced. In addition, since the cooling water is set at a high temperature in a predetermined low rotation speed region (where the rotation speed is not higher than the predetermined value B) and relatively set at a low temperature in a high rotation speed region, the occurrence of knocking of the engine 2 is suppressed. Since the Rankine cycle operating region is set in a high temperature setting region of the cooling water, the cooling water temperature during the operation of the Rankine cycle becomes relatively high and heat recovery efficiency of the expander 37 is improved.

<2> A high-efficiency rotation speed range of the expander 37 corresponds to an engine rotation speed range of the high temperature setting region of the cooling water. In other words, the cooling water is set at a low temperature in a region where the friction of the expander 37 increases to reduce the efficiency. This is to cause the Rankine cycle 31 to be operated in a region where an operation frequency is high and fuel economy should be improved. Conversely, this is to cause the Rankine cycle 31 not to be operated in a region where a low temperature has to be set to avoid knocking since it is inefficient.

<3> An extremely low rotation speed region (idle rotation speed region where the rotation speed is not higher than a predetermined value A) is the Rankine cycle non-operating region. In the extremely low rotation speed region, the ability of the condenser 38 is low since the vehicle speed is low and traveling air is weak. Even if the Rankine cycle 31 is operated in such a case, the efficiency is poor. Thus, components may be degraded due to unnecessary operation if the Rankine cycle 31 is operated in such a case. Therefore, in such a case, reliability is enhanced by reducing component degradation and extending components' lives by not operating the Rankine cycle 31.

<4> A high load region (torque region not lower than a predetermined value C) is the Rankine cycle non-operating region. In such a region, the friction is high and the efficiency of the expander 37 is low. In such an inefficient state, the Rankine cycle 31 is not operated.

The above predetermined values A, B and C are determined by adaptation in terms of efficiently operating the Rankine cycle 31, but not determined in terms of thermal efficiency of the engine 2. The predetermined value A is, for example, an engine rotation speed equivalent to a vehicle speed of 10 km/h. The predetermined value B is, for example, about 3000 rpm.

Next, valve opening temperatures of the thermostat valve 15 are described. It should be noted that the valve opening temperatures of the thermostat valve 15 correspond to the operating region and the non-operating region of the Rankine cycle 31 shown in FIG. 11 to simplify the control of the electronically controlled thermostat valve 15. Specifically, the valve opening temperature of the thermostat valve 15 is set relatively high in the rotation speed region (shaded region) not higher than the predetermined value B and including the Rankine cycle operating region. In the rotation speed region (region enclosed by broken line) exceeding the predetermined value B, the valve opening temperature of the thermostat valve 15 is set relatively low. For example, a relatively highly valve opening temperature is 100° C. A relatively low valve opening temperature is 82° C. It should be noted that temperatures at which a fully open state is reached are shown as typical temperatures of these valve opening temperatures. By dividing a control region of the Rankine cycle 31 into two and determining the valve opening temperature for each control region in this way, the valve opening temperature of the thermostat valve 15 is set relatively high in the Rankine cycle operating region.

In this way, in the present embodiment, the valve opening temperature of the electronically controlled thermostat valve 15 is set high when the Rankine cycle 31 is operated. That is, when the rotation speed is lower than the predetermined value B, the Rankine cycle 31 is operated and the valve opening temperature of the electronically controlled thermostat valve 15 is set high. When the engine rotation speed exceeds the predetermined rotation speed, the Rankine cycle is not operated.

In the Rankine cycle operating region where the rotation speed is lower than the predetermined value B, the electronically controlled thermostat valve 15 is closed until the cooling water temperature reaches 100° C. As a result, the cooling water flows into the bypass cooling water passage 14, but does not flow into the radiator 11. When the cooling water temperature exceeds 100° C., the electronically controlled thermostat valve 15 is opened. As a result, the cooling water flows into the radiator 11 and the cooling water cooled in the radiator 11 is supplied to the engine.

On the other hand, in the case of exceeding the predetermined value B, the electronically controlled thermostat valve 15 is closed until the cooling water temperature reaches 82° C. As a result, the cooling water flows into the bypass cooling water passage 14, but does not flow into the radiator 11. When the cooling water temperature exceeds 82° C., the electronically controlled thermostat valve 15 is opened. As a result, the cooling water flows into the radiator 11 and the cooling water cooled in the radiator 11 is supplied to the engine.

The configuration of the electronically controlled thermostat valve 15 having two valve opening temperatures (82° C., 100° C.) is described below.

The mechanical thermostat valve 15 is, for example, so configured that a piston is incorporated in the center of a container filled with solid wax and an elastic body (rubber). One end of the piston is fixed to an external flange. A valve main body is located outside the container. During a non-operating period, the valve main body is pushed up by a spring to block a passage (inlet port 15b of FIG. 1). When a cooling water temperature increases to a predetermined value, the wax expands to undergo a volumetric change. A pressure produced at this time acts on the piston via the elastic body. Since the piston is fixed to the flange, the container is relatively lowered and the valve main body fixed in the container is opened to form a flow passage. Specifically, the inlet port 15b of FIG. 1 is opened. That is, the above predetermined value is a cooling water temperature (valve opening temperature) when the valve main body is opened.

The electronically controlled thermostat valve 15 is so configured that a heater 15e is incorporated in a wax part in a container. If the heater 15e is energized, an amount of heat is supplemented and a valve main body 15a operates to open a flow passage (inlet port 15b) even if the cooling water temperature has not reached the above predetermined value. That is, if the heater 15e is energized, the valve opening temperature is lower than the above predetermined value.

An electronically controlled thermostat valve specified so as to be opened at a cooling water temperature of 100° C. during a non-energization period and opened at a cooling water temperature of 82° C. during an energization period is commercially available. In this embodiment, such an electronically controlled thermostat valve is used.

As shown in FIG. 10, a normally open switching element 15f is connected in series with the heater 15e. One side of series connection is connected to a positive terminal of a battery 9. The other side is grounded. An engine rotation speed detected by a crank angle sensor 91 is input to the engine controller 71. Further, an accelerator pedal opening detected by an accelerator pedal opening sensor 92 is input to the engine controller 71. Then, the engine controller 71 controls the switching element 15f to control the energization and non-energization of the heater 15e based on these input signals.

Figure 12:
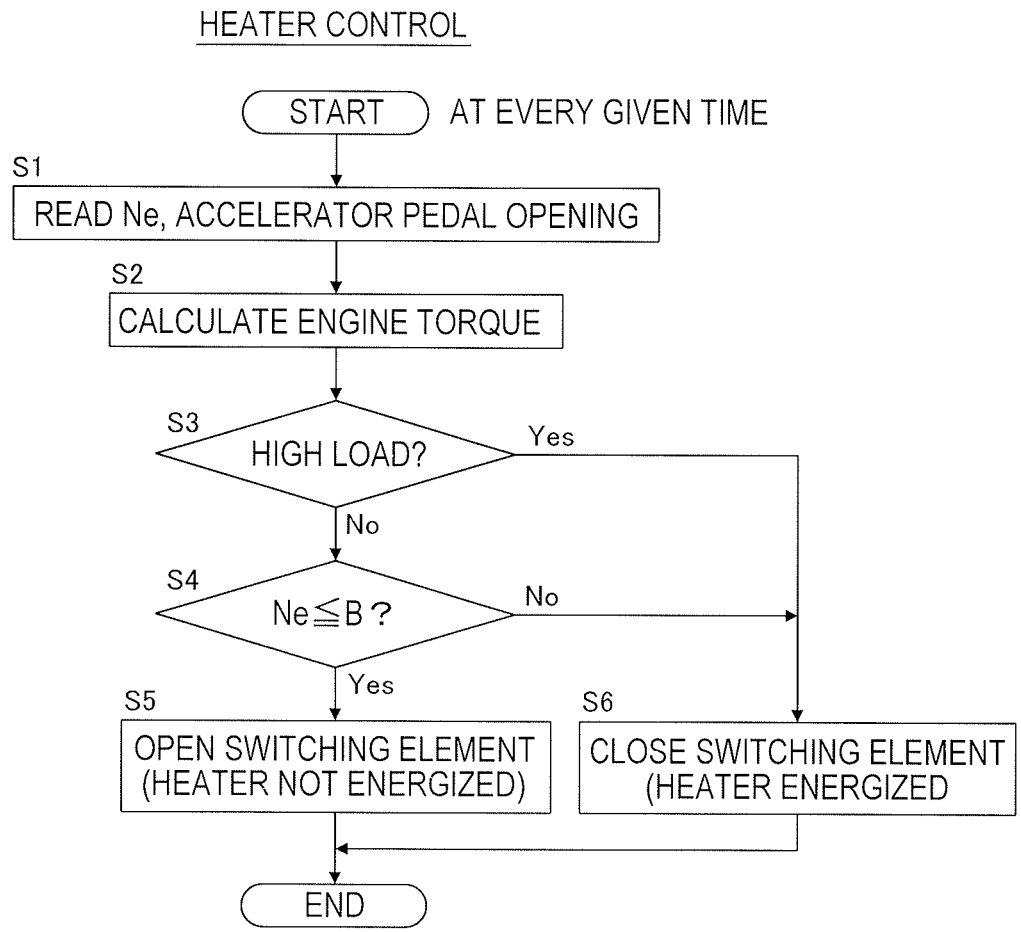
FIG. 12 is a flow chart showing a control of an electrically controlled thermostat valve including a heater.

This control is described with reference to a flow chart of FIG. 12. The flow chart of FIG. 12 is executed in a certain time cycle (e.g. cycle of 10 ms).

In Step 1, the engine controller 71 reads an engine rotation speed Ne detected by the crank angle sensor 91 and an accelerator pedal opening detected by the accelerator pedal opening sensor 92.

In Step 2, the engine controller 71 calculates an engine torque using a known method based on the engine rotation speed Ne and the accelerator pedal opening or an intake air amount. For example, the engine controller 71 calculates the engine torque by retrieving a predetermined map based on the engine rotation speed Ne and the accelerator pedal opening.

In Step 3, the engine controller 71 determines whether or not a load has become high. Specifically, the engine controller 71 determines whether or not an operation point determined from the engine torque and the engine rotation speed Ne belongs to a torque region higher than the predetermined value C of FIG. 11. The load is high if the operation point belongs. If the determination result is positive, the engine controller 71 proceeds the process to Step 6. In Step 6, the engine controller 71 closes the switching element 15f to energize the heater 15e. This causes the electronically controlled thermostat valve 15 to be opened when the cooling water temperature reaches 82° C. This suppresses knocking when the load becomes high. Specifically, when the load becomes high, the engine controller 71 energizes the heater 15e and opens the electronically controlled thermostat valve 15 at 82° C. on a low temperature side. Then, the cooling water cooled in the radiator 11 is supplied to the engine 2, wherefore knocking is suppressed.

The engine controller 71 proceeds the process to Step 4 if the determination result is negative in Step 3. In Step 4, the engine controller 71 determines whether or not the engine rotation speed Ne is not higher than the predetermined value B. The predetermined value B is a value for determining a rotation speed upper limit of the Rankine cycle operating region and determined in advance. The engine controller 71 proceeds the process to Step 5 if the determination result is positive. In Step 5, the engine controller 71 outputs no signal to the switching element 15f. Then, the switching element 15f is kept open and the heater 15e is in a non-energized state. As a result, the valve opening temperature of the electronically controlled thermostat valve 15 becomes 100° C. That is, in the Rankine cycle operating region where the Rankine cycle 31 is operated, the electronically controlled thermostat valve 15 is opened when the cooling water temperature reaches 100° C. In other words, in the Rankine cycle operating region, the cooling water temperature is higher than in the Rankine cycle non-operating region and heat recovery efficiency of the expander 37 is improved.

If the determination result of Step 4 is negative, the engine controller 71 proceeds the process to Step 6. When the engine rotation speed Ne is higher than the predetermined value B, a transition is made to Step 6 to energize the heater 15e. In Step 6, the engine controller 71 closes the switching element 15f to energize the heater 15e. This causes the electronically controlled thermostat valve 15 to be opened when the cooling water temperature reaches 82° C. That is, in the Rankine cycle non-operating region, the electronically controlled thermostat valve 15 is opened when the cooling water temperature reaches 82° C.

In the above example, the Rankine cycle operating region and non-operating region are divided according to engine operating conditions (load and number of revolutions). Then, the setting of the cooling water temperature is changed. However, there is no limitation to this. For example, the Rankine cycle operating region and non-operating region may be divided under the same engine operating conditions instead of being divided according to the engine operating conditions (load and number of revolutions). Then, the setting of the cooling water temperature may be changed in the Rankine cycle operating region and non-operating region.

Next, functions and effects of the present embodiment are described.

According to the present embodiment, the cooling water temperature is relatively higher in the Rankine cycle operating region than in the Rankine cycle non-operating region. As a result, the temperature and pressure of the gas refrigerant at the exit of the heat exchanger 36 become higher and heat recovery efficiency of the expander 37 is improved. On the other hand, knocking is suppressed since the cooling water temperature is relatively low in the Rankine cycle non-operating region.

Further, a region where heat recovery efficiency of the expander 37 is improved by setting the cooling water temperature relatively high when the Rankine cycle 31 is operated is a low/middle load (or low/middle rotation speed) region where a heat load of the engine 2 is low, specifically a region where an engine output is small and there is large room for fuel economy improvement by an engine friction reduction. As a result, the engine friction is also reduced.

According to the present embodiment, the electronically controlled thermostat valve 15 capable of arbitrarily setting the valve opening temperature is used. Then, the valve opening temperature is set higher when the Rankine cycle 31 is operated than when the Rankine cycle 31 is not operated (see Steps 2 to 4 of FIG. 12). Thus, the device is easily realized.

According to the present embodiment, when the engine 2 has a high load, the valve opening temperature is the same as when the Rankine cycle is not operated (see Steps 3, 6 of FIG. 12). Thus, knocking at a high load is suppressed.

The heat exchanger 36 is provided in the bypass cooling water passage 14. Due to such a configuration, the cooling water flowing in the bypass cooling water passage 14 and the refrigerant exchange heat. If a high temperature is set, an amount of the cooling water flowing in the bypass cooling water passage 14 increases. Thus, when the Rankine cycle 31 is operated, the cooling water and the refrigerant efficiently exchange heat.

Although the embodiment of the present invention has been described above, the above embodiment is only an illustration of one application example of the present invention and not intended to limit the technical scope of the present invention to the specific configuration of the above embodiment.

For example, although the case of the hybrid vehicle has been described in the above embodiment, there is no limitation to this. The present invention can be applied also to a vehicle mounted only with the engine 2. The engine 2 may be either a gasoline engine or a diesel engine.

Although the electronically controlled thermostat valve has been described in the embodiment, a duty controllable valve may be, for example, used. In this case, a valve opening amount may be set smaller when the Rankine cycle is operated than when the Rankine cycle is not operated.

This application claims a priority of Japanese Patent Application No. 2011-216786 filed with the Japan Patent Office on Sep. 30, 2011, all the contents of which are hereby incorporated by reference.

What is claimed is:

1. An engine-waste-heat utilization device, comprising:
    a Rankine cycle which includes:
        a heat exchanger through which waste-heat of cooling water coming out from an engine is recovered to refrigerant;
        an expander which generates power using the refrigerant coming out from the heat exchanger;
        a condenser which condenses the refrigerant coming out from the expander; and
        a refrigerant pump which supplies the refrigerant coming out from the condenser to the heat exchanger;
    a cooling water passage in which the cooling water coming out from the engine flows;
    a thermostat valve configured to open to allow the cooling water to flow to a radiator at a temperature higher than a predetermined temperature, and to close not to allow the cooling water to flow to the radiator; and
    an engine controller configured to switch the predetermined temperature among at least two temperature setting values in accordance with whether the Rankine cycle is operated or not,
    wherein the engine controller is further configured to switch the predetermined temperature to a higher temperature setting value in a case where the Rankine cycle is operated compared with a temperature setting value in a case where the Rankine cycle is not operated.

2. The engine-waste-heat utilization device according to claim 1, wherein the cooling water passage includes:
    a first cooling water passage which supplies the cooling water coming out from the engine to the radiator;
    a second cooling water passage which returns the cooling water coming out from the radiator to the engine; and
    a bypass cooling water passage which is branched off from the first cooling water passage, bypasses the radiator, and joins the second cooling water passage.

3. The engine-waste-heat utilization device according to claim 2,
    wherein the heat exchanger is provided in the bypass cooling water passage to perform heat exchange between the cooling water flowing in the bypass cooling water passage and the refrigerant.

4. The engine-waste-heat utilization device according to claim 2,
    further comprising a heater provided in a vicinity of the thermostat valve,
    wherein the thermostat valve is electrically controlled, and the engine controller is further configured to switch the predetermined temperature by turning the heater on or off.

5. The engine-waste-heat utilization device according to claim 4,
    wherein the engine controller is further configured to turn the heater off when the Rankine cycle is operated but turn the heater on when the Rankine cycle is not operated.

6. The engine-waste-heat utilization device according to claim 4,
    wherein the engine controller is further configured to turn the heater on so that the Rankine cycle is not operated when the engine has a high load.

7. An engine-waste-heat utilization method for a system, the system comprising:
    an engine;
    a Rankine cycle which includes:
        a heat exchanger through which waste-heat of cooling water coming out from the engine is recovered to refrigerant;
        an expander which generates power using the refrigerant coming out from the heat exchanger;
        a condenser which condenses the refrigerant coming out from the expander; and
        a refrigerant pump which supplies the refrigerant coming out from the condenser to the heat exchanger;
    a cooling water passage in which the cooling water coming out from the engine flows; and
    a thermostat valve configured to open to allow the cooling water to flow to a radiator at a temperature higher than a predetermined temperature, and to close not to allow the cooling water to flow to the radiator,
    the method comprising:
    switching the predetermined temperature among at least two temperature setting values in accordance with whether the Rankine cycle is operated or not such that the predetermined temperature is switched to a higher temperature setting value in a case where the Rankine cycle is operated compared with a temperature setting value in a case where the Rankine cycle is not operated.

* * * * *